Dec. 22, 1931.  G. J. ESSELEN, JR., ET AL  1,837,855
METHOD FOR MANUFACTURE OF PYROXYLIN PLASTIC IN CONTINUOUS SHEET FORM
Original Filed Jan. 17, 1929    3 Sheets-Sheet 3

INVENTORS.
Gustavus J. Esselen Jr.
and
Robert G. O'Kane
BY Chapin & Neal
ATTORNEYS.

Patented Dec. 22, 1931

1,837,855

UNITED STATES PATENT OFFICE

GUSTAVUS J. ESSELEN, JR., OF SWAMPSCOTT, AND ROBERT G. O'KANE, OF SPRINGFIELD, MASSACHUSETTS, ASSIGNORS TO THE FIBERLOID CORPORATION, OF INDIAN ORCHARD, MASSACHUSETTS, A CORPORATION OF MASSACHUSETTS

METHOD FOR MANUFACTURE OF PYROXYLIN PLASTIC IN CONTINUOUS SHEET FORM

Application filed January 17, 1929. Serial No. 333,093.

This invention relates to a method and apparatus for the manufacture from plastic derivatives of cellulose, of a hardened product in continuous sheet form. In its special application about to be described, the invention has to do with the preparation and finished production of pyroxylin plastics commercially known as fiberloid or celluloid; but it is to be understood that its application may be extended to other analogous products having similar working characteristics.

The main object of the invention is to improve the quality and reduce the cost of production of hardened pyroxylin plastics and analogous materials for all purposes of fabrication for which such material is suited, and incidentally to produce a hardened sheet continuously in any length desired. Accordingly, the invention contemplates the elimination or modification of many of the manipulative steps heretofore considered necessary in the manufacture of hardened pyroxylin plastics and which have involved expensive mechanical equipment, repeated manual handling and time consuming treatment throughout the various stages of the process.

In place of the relatively expensive and more or less segregated operations heretofore carried out in the manufacture of pyroxylin plastics, the present invention substitutes a series of correlated consecutively arranged steps which may be conveniently performed by apparatus designed to handle the material in a continuous flow from its initial stage of mixing throughout to the finished hardened sheet. An advantage of this method of production, aside from its resulting economy, is that the material being processed may be conducted entirely through housed chambers for excluding dirt or the contaminating effects of the outside atmosphere.

In order that the invention may be more readily appreciated, a brief review will be given of the standard practice now commonly employed in the preparation of pyroxylin plastics. Pyroxylin, specifically cellulose nitrate (but understood here as typical of many other cellulose esters) is prepared by nitrating cellulose in the well known manner. For use in the plastic industry, the nitration should be controlled to give a product of relatively low nitrogen content as compared with the higher nitrates used in the powder industry, all as well understood.

The pyroxylin is thoroughly mixed with suitable proportions of camphor and a volatile liquid solvent, i. e., ethyl alcohol (commercially known as 2 B alcohol from the government name of its denaturing process), until the mass has reached a homogeneous plastic condition with the pyroxylin thoroughly dissolved in the alcohol and camphor. This mixing or conversion of the pyroxylin into plastic is accomplished in any one of a number of standard mixing machines for the purpose. The workability of this plastic mass in the mixer as regards its viscous quality may be varied for different purposes by different manufacturers, but in general, if the homogeneous character of the pyroxylin has been maintained by proper control of the nitration as to temperature and acid composition, the viscosity of the plastic mass will be determined by the character and amount of liquid solvent present. It is usual therefore when referring to the workable or viscous character of the mass, to speak of its concentration, i. e., the percentage of liquid solvent present. The proportion of liquid solvent (ethyl alcohol) in the plastic mass within the mixer is usually about one third of the whole and a stock of this concentration may be readily filtered through a hydraulic ram operated filter which is the next step in the standard practice.

The liquid solvent (ethyl alcohol) having now performed its main function of assisting the solvent action of the camphor and of rendering the mass sufficiently workable for subsequent operations and particularly its filtration, the succeeding steps of the standard practice are aimed, among other purposes, toward the rapid removal of the liquid solvent. A common step which follows the filtration is to further work the stock in a vacuum mixer for an initial extraction of liquid solvent. Thereafter the stock is rolled for a considerable length of time between high pressure calender rolls which in some cases are heated to further drive off solvent and thoroughly work the components of the mass together. At the end of the rolling operation, the mass has lost a considerable amount of its liquid solvent and is rapidly becoming hard. The material is withdrawn from the calender rolls by hand in the form of roughly shaped slabs of irregular thickness and are thereafter given such regular shape and form as may be desired for fabrication purposes.

In order to prepare the material for cutting into sheets, the slabs from the calender rolls are subjected to a cake pressing operation in well known apparatus for welding the slabs by heat and pressure into consolidated cakes, followed by a cooling thereof for removal from the press. Cakes thus formed are placed in a sheeting machine operating in the manner of a planer for cutting up the cakes into sheets of the desired thickness. The sheets obtained from the sheeting apparatus are pliable and soft and will contain solvent necessary to be removed by seasoning before the sheets are finally polished and made ready for the market.

In the process just outlined, the material must be repeatedly handled manually for transportation between the different machines. The mechanical apparatus is elaborate; a large amount of manual labor must be performed in connection with its use; the power expenditure is large and a considerable wastage in scrap results therefrom. In the making of thin sheets, the shaping operations of cake pressing and sheeting require the presence of some solvent in the material for their successful operation and the removal of this remaining solvent from the cut sheets necessitates a seasoning period of a few days to several weeks depending on the thickness of the sheets. Moreover the handling of such separate sheets for storage in a drying room is expensive as regards labor and any appreciable storage period adds considerably to the cost of production in the matter of tied up inventory. By our improvement, the greater part of this expense is eliminated, a product of equal or better quality is obtained, and for certain purposes, as for instance continuous sheets of any length, a product which cannot be produced under the old method.

The preferred method of carrying out our invention will now be described with particular reference to the production of relatively thin sheets, approximating .020 of an inch in thickness such as may be used in the manufacture of laminated window glass to render the same non-shattering. The invention, however, should not be considered as limited to this product since with suitable modifications in apparatus and in the scale of the treating steps much thicker sheets may be produced. In the following description, it should also be understood that the mention of a particular cellulose ester, its plasticising agent and its liquid solvent, is intended to include commonly understood equivalents therefor in this art.

The improved method of this invention will follow standard practice up to and including the step of mixing the pyroxylin, with its plasticising solvent and its liquid solvent. The usual pyroxylin plastic mixing machine will be used for this operation. The proportions of pyroxylin and its plasticiser (i. e., camphor) will be standard; but the proportion of liquid solvent in the mixture may vary depending upon whether our process is to be carried out according to one modification of our process herein termed the dry method, or according to another modification of our process herein termed the wet method.

Our dry method will be first described and in this the proportion of liquid solvent will be substantially that of a standard mixture, viz., approximately one third of the whole. In order that this proportion of liquid solvent will result in the desired viscosity of the plastic mass for subsequent working operations, the pyroxylin (cellulose nitrate) in the mixture should be of homogeneous character obtained by a proper control of the nitration operation as to temperature and acid composition. It is not deemed necessary to describe in detail the production of the pyroxylin since this is well known and in the present case it should be prepared with the same care and degree of nitration as would be carried out in the commercial manufacture of celluloid or fiberloid.

Among the volatile solvents found most suitable for use as the liquid solvent of the mixture are acetone, ethyl alcohol and ethyl acetate. Of these, ethyl alcohol (commercial 2 B alcohol) is preferred as the liquid solvent in our dry process. Its amount in the mixed mass of pyroxylin and camphor should preferably be such as will give what is known commercially as a 130 oz. concentration. This means that the mass is made up in the proportions 1 gallon of liquid solvent to each 130 oz. of pyroxylin. This concentration mentioned need not be rigidly adhered to and a variation therein of from 100 oz. to 150 oz. or more may be used; but for a high average of efficiency in production, and for a high degree of perfection in the product, a concentration of 130 oz. has been found preferable.

The complete conversion of the pyroxylin with camphor and solvent into a homogeneous plastic mass by thorough working in the mixer may be regarded as the first step of our process. If a colored product is desired, the coloring material may be added in the mixer for incorporation in the mass. For a clear transparent product, suitable stabilizing agents may be added in the mixer according to well understood practice. For most products, it will be desirable to filter the plastic mass to remove dirt and foreign matter. The filtration proceeds directly after the completion of mixing and may take place in a standard type of hydraulically operated ram filter through suitable filtering material such as 8 oz. duck.

The next step of the process consists in shaping the plastic mass into a sheet preparatory to the removal of liquid solvent and hardening. This is accomplished in an extruding machine wherein the mass is forced under heavy pressure through a die with a slot-like opening, in the form of a continuous sheet or web. The extruding pressure and working parts of the extruding machine are adjusted as closely as possible to get an even and uniform rate of extrusion for the web. The web thus formed may be relatively thin (approximately .027 to .033 of an inch in thickness), but may be relatively wide, say 21 inches or wider. The web formed by the die should be slightly thicker and wider than the final dimensions of the web desired to allow for subsequent shrinkage. Either a straight ribbon die may be employed, or it may be desirable to extrude the mass through a tubular die provided with a core or mandrel whereby the slot-like opening is circular with a circumference equal to the width of the web being formed. A slitting device may be suitably mounted at a point in the circular slot of the die for cutting the tubular web continuously as it emerges from the die preparatory to its being flattened out.

In leaving the die of the extruding machine, the web is quite soft and pliable, having lost but a very small amount of its liquid solvent from the time of the mixing operation. Up to this stage, precautions are taken to prevent the escape of liquid solvent and with this object in view the mass will be conducted for the previous steps mentioned in a continuous manner through enclosed channels and chambers. An important feature in the present process resides in the manner of the subsequent handling and treatment of the web after it leaves the extruding die for the purpose of obtaining a sheet of smooth surface and of even, uniform gauge or thickness throughout its length and width.

The extruding die will be of such design and have such provisions for adjusting the width of its slot as to make possible the extrusion of the web with a substantially smooth surface and of substantially even gauge; but if any slight irregularities in this respect occur, they can be corrected in the subsequent steps now to be described. The formed web is continuously withdrawn from the die, whether it be straight or tubular, preferably under a slight and uniformly applied longitudinal tension, and is thereby given a moderate stretching to insure as far as possible its smoothness in withdrawal and yet not materially reduce its thickness.

When extrusion takes place through a tubular die, the next step is the opening out of the still soft and pliable tubular web and extending it into flat form. This is accomplished by withdrawing the web from the die under sufficient tension to stretch it out flat and smooth over properly designed and suitably located guide rolls. Means are provided for accurately adjusting the uniform tension of withdrawal of the web to avoid breakage at this point and yet pull the web out smoothly. This tension may be varied for webs of different strength or consistency as will be obvious. From the die, the web is led over guiding or spreader rolls. The spreader rolls may be designed to give a slower surface speed for contact at the center line of the web and with a progressively increased surface speed for the contact on the web from the center toward each margin thereof.

After passing over the guiding or spreader rolls, the web preferably travels in a loop around a tension device or roll which may be weighted to give even tension and to lengthen or shorten the loop for the accommodation of any irregularity which may possibly occur in the speed of extrusion.

The next step in the treatment of the web after it has been directed into its flat form by tension and guiding means as described, is to subject it to what may be termed an ironing operation for improving the uniformity of its gauge and the smoothness of its surface.

This may be conveniently accomplished by leading the web alternately around a series of smooth, hard-surfaced cylinders to bring opposite sides of the web in successive wrapping contact with alternate cylinders. The cylinders are mechanically rotated at the same surface speed as the travel of the web and any relative rubbing action between the web and cylinders is avoided. The cylinders may be of large diameter and are preferably spaced apart for an easy bend of the web in running from one to the other. The tension imparted on the web between its run from the die to the ironing cylinders will cause its snug wrapping contact upon the cylinders, which, particularly with a thin web as described, will serve to compact the material of the web into firm, homogeneous condition as well as to improve its surface and gauge. Furthermore, the wrapping contact of the web on the ironing cylinders affords by its frictional contact a restraint upon the tendency of the web to shrink in width and thus further assists in producing a smooth, even surface.

The ironing effect of the cylinders may be increased by heating them. The duration or amount of ironing treatment of the web will be adjusted as to the degree of heat imparted to the cylinders and as to length of contact surface thereof, viz. the number and diameter of cylinders employed, depending on the consistency of the web and its speed of extrusion. The object at this stage is that of improving the gauge and the surface smoothness of the web without any appreciable hardening of the web as a whole. The web upon leaving the ironing cylinders should have a smooth surface on both sides which may even show a definite polish.

The travel of the web from the extruding die to the ironing cylinders is preferably through an atmosphere of air or gas in an enclosing chamber for a preliminary surface hardening of the web, which will allow enough evaporation of the liquid solvent to prepare the surface of the web for its subsequent travel and permit the web to come in contact with the ironing cylinders without sticking thereto. While traveling around the ironing cylinders, the web will be preferably surrounded by conditioned air or gas also in an enclosing chamber, which will be controlled to retard the evaporation of liquid solvent and prevent any rapid hardening of the web at this time.

The next step in the process is to subject the web during its continued travel to a transverse stretching operation for reducing its gauge and rendering it of substantially uniform thickness throughout. An actual increase in width of the web for this stretching operation is found unnecessary since the web at this stage will be allowed to lose its liquid solvent rapidly by evaporation and will have a strong tendency toward shrinkage. The stretching effect may be given to the web merely by clamping the marginal edges tightly and preventing its tendency to shrink. This is preferably carried on for a length of time depending upon the rate at which solvent removal is taking place in the web at this stage, the thickness of the web, and the degree in uniformity of gauge desired.

The apparatus for performing this stretching operation may be similar in character to what is known in the cloth treating industry as a tenter. It provides for a successive clamping at intervals of the opposite marginal edges of the web as it travels and holds the same in clamped condition for any length of travel desired, finally releasing the web successively at intervals for its continued travel to other treating apparatus. A feature of this clamping apparatus of especial importance to the present process is the provision of means to clamp the web continuously along its marginal edges so as to leave no unclamped portions of the web from end to end of the clamping apparatus. This will be more particularly referred to in our later description of the preferred apparatus for carrying out this process.

The web while in the tenter will preferably travel through an enclosed chamber which will be supplied with drying air or gas suitably controlled as to condition for effecting a rapid removal of liquid solvent from the web by evaporation. The drying action on the web as it leaves the extruding die will be first a quick but momentary surface drying, then a retardation of the drying while on the ironing rolls, and later the beginning of the more thorough drying of the web while in the tenter.

The next step in the process is to dry out and thoroughly season the web by the removal of its remaining liquid solvent to the extent of its marketable condition. This is done preferably by causing the web to travel continuously from the tenter to and through a sufficiently long seasoning chamber and against a countercurrent of drying air or other gas so that the web will be dried from its inside outwardly rather than from its outside inwardly. The web should be in a freely supported condition while passing through the seasoning dryer and this may be taken care of by traveling supporting belts, guide rolls, or festoon drying apparatus of any suitable character. The time of seasoning will be varied according to the thickness of the web, its consistency, etc.; but with a thin web of the particular character here described, the seasoning will be a matter of a few hours as compared with days under the old methods. The initial temperature of the drying air as it acts upon the finished end of the traveling web may be about 130° F.

The counter-current of drying air is preferably directed for a progressive action upon the web during its entire run from the exit end to the inlet of the seasoning chamber. The penetrative drying action of the air on the web will be greatly enhanced by this method of treatment.

The web, upon leaving the seasoning chamber, is thoroughly hardened and considered finished as far as the present process is concerned. Thereafter it may be cut up into sheets for the market in any length desired and subjected to a press polishing operation in the usual manner well understood in the art.

Wet method

A modification of the above dry method and which is termed our wet method, will now be described. In this, certain modifications are introduced in some of the steps whereby the removal of the volatile solvent from the formed web may be greatly accelerated and thus make practical the use when desired of a mixture of much lower concentration, i. e., with an excess of liquid solvent present, over that preferably used in the dry method and over the usual amount used in standard practice of mixing pyroxylin.

It is proposed in our wet method to start with a mixture of pyroxylin and camphor in standard proportions but with an excess of liquid solvent. The amount of liquid solvent for this mixture may be varied within wide limits to give a concentration of from 20 oz. to 150 oz. if desired. Preferably, however, a concentration equivalent to about 40 oz. pyroxylin per gallon of liquid solvent will be used in the initial mixture.

The volatile liquid solvent may be any one of those heretofore named for the dry method or their equivalent, but ethyl acetate is preferably selected for our wet method. The liquid solvent, particularly when a mixture of relatively low concentration is used as mentioned, will be preferably diluted for introduction into the mixture with a miscible liquid which is a non-solvent of the pyroxylin. The requirements of this non-solvent component of the liquid solvent are that it shall have no harmful effects on the pyroxylin-camphor stock, but will act as a diluent of the liquid solvent so as to reduce its solvent power to a point just short of precipitating or coagulating the pyroxylin. A suitable non-solvent for use with ethyl acetate in forming the liquid solvent is V. M. P. naptha and in connection with a mixture of 40 oz. concentration as described, the proportions for the liquid solvent may be about 2 parts of V. M. P. naptha to each 5 parts by volume of ethyl acetate.

An advantage of the non-solvent (V. M. P. naptha) is that it furnishes a liquid component in the solvent for the desired working viscosity in the plastic mass and having less affinity than the volatile solvent for the pyroxylin is later removed more easily by evaporation. Apparently the non-solvent also assists in the removal of the solvent component so that the plastic mass may be more rapidly hardened in the subsequent steps of the process.

The first step in our wet process will then be the mixing operation in a standard mixer of the pyroxylin camphor and liquid solvent and will be carried out as described in our dry method so as to thoroughly plasticise the mass into a homogeneous and completely converted condition. The filtration of the converted plastic mass after it leaves the mixer will then take place.

The second step will be the extrusion of this mass into a web either tubular or in straight ribbon form, and these operations will be precisely the same as has been described in the dry method.

The next step, however, departs from the dry modification in that the web as it continuously comes from the extruding die is led through a hardening bath of liquid for a relatively long immersion therein. The liquid of this hardening bath should be such as to have no harmful effect on the pyroxylin web, and it should be a non-solvent of the pyroxylin and preferably also a non-solvent of its camphor content, although any solvent power it may have on the camphor can be counteracted by introducing a solution of camphor in proper amount in the liquid bath. Also the liquid of the bath should be readily miscible with the liquid solvent of the pyroxylin so as to displace or replace this liquid solvent in the web.

When ethyl acetate (diluted or not with the V. M. P. naptha) is employed as the liquid solvent in the mixture, a satisfactory liquid for the hardening bath is V. M. P. naptha. Since this naptha will tend to dissolve and remove camphor from the web, such a bath should be supplied with sufficient camphor in solution to prevent any removal of camphor from the web.

The web extruded from the die will preferably be supported in traveling through the hardening bath and such a support may be supplied by a traveling belt or other suitable means for receiving the web and conveying it through the hardening bath for a sufficient length of time to harden its surface. A web of the low concentration mentioned will be too soft to submit to any tension in being withdrawn from the die, but a web of higher concentration might be given a slight tension for withdrawal as described in connection with the dry method. A two minute immersion in the hardening bath will usually be found sufficient for a web of the low concentration here considered, viz., 40 ox. During the immersion of the web in the hardening bath, much of its liquid solvent (ethyl acetate) will be displaced and some replaced by the non-solvent V. M. P. naptha; but this replacement in the web will nevertheless leave it appreciably hardened at least sufficiently so that the web may be conducted out of the hardening bath and led over a tensioning device or roller to the ironing cylinders described in connection with our dry method. The steps of the wet method, subsequent to the treatment in the hardening bath and beginning with the ironing operation will be precisely the same as those described in our dry method.

It will be observed that in both our dry and wet methods, the removal of solvent from the web has taken place in three successive stages during its travel, the first or preliminary hardening stage as the web leaves the die, the second stage during the travel of the web over the ironing cylinders, and through the tenter, and the final stage in the seasoning chamber.

For the successful carrying out of the wet method, it is necessary to maintain the hardening bath against deterioration of its V. M. P. naptha by the displaced ethyl acetate of the web, and consequently suitable purifying apparatus may be employed in conjunction with the bath to remove the ethyl acetate therefrom and replenish the V. M. P. naptha or any camphor that may be lost therefrom. This will be accomplished preferably in a continuous manner and without interfering with the continued operation of the hardening process. It is contemplated also in both our dry and wet methods that suitable means may be employed for the recovery of the vaporized solvent and non-solvent which leave the web during the various steps of hardening the same.

The preferred apparatus for carrying out the steps of our process both wet and dry is illustrated somewhat diagrammatically in the accompanying drawings, in which.

Figures 1, 2:
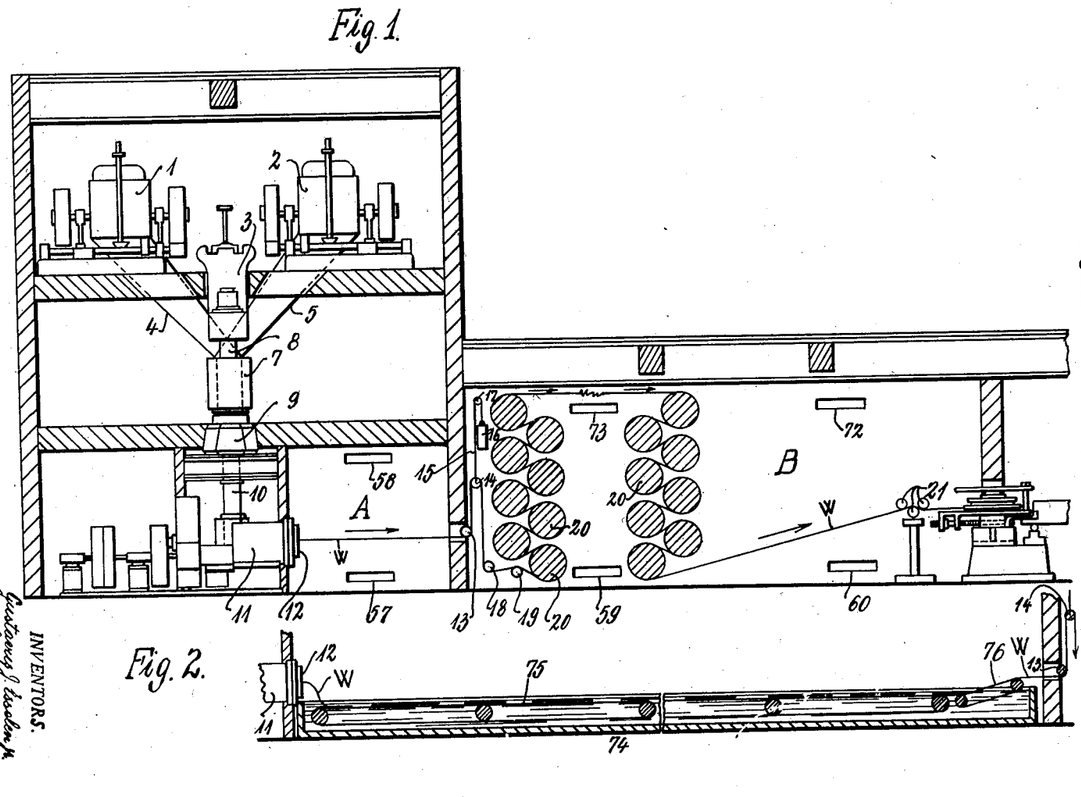
Fig. 1 illustrates the train of apparatus from the mixers to the beginning of the tenter.
Fig. 2 is a detached view of the apparatus for the liquid hardening bath which, in our wet method, will be located in the train between the extrusion machine and the ironing cylinders and will replace the straight run of the web in the chamber A in Fig. 1.
Figure 4:
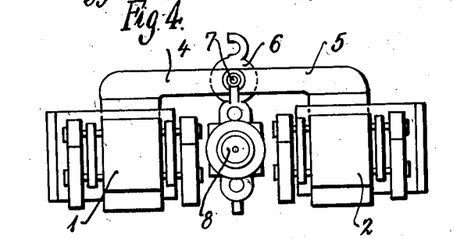
Fig. 4 is a detached plan view looking from above upon the mixers and hydraulic ram filter shown in Fig. 1.

Referring more particularly to Fig. 1, 1 and 2 indicate mixing machines or pyroxylin mixers for the conversion of the pyroxylin as previously described, which are preferably arranged, above a standard type of double cylinder hydraulic ram filter 3 so that said mixers may alternately discharge their contents by gravity into a cylinder of the filter through discharge chutes 4 and 5. As shown in Fig. 4, the hydraulic ram filter is of the type comprising two cylinders which may be alternately swung from a filling position to a filtering position. In this figure, the cylinder 6 is in filling position beneath a hydraulically operated compacting plunger 7 and also beneath the discharge end of the mixer chutes 4 and 5. The other cylinder 7 of said ram filter is in position below the main ram plunger 8 of the filter and so that the contents thereof may be forced through the filtering material (cloth or screen) supported in the filter chamber 9 of said filter. The filtered material or plastic pyroxylin mass is discharged through conduit 10 directly into the receiving end of an extrusion machine 11.

The extrusion machine is power operated and preferably of the type wherein a continuously rotating propelling screw feeds and forces with high pressure, by an action known as force extrusion, the plastic material received therein out through a die slot at its forward end 12. The die slot of this extrusion machine may either be straight, of the type known as a ribbon die, or it may be circular, of the type know as a tubular die, and in the present apparatus is designed to form the extruded mass into a relatively thin, continuous web, indicated diagrammatically at W as issuing from the die.

The continuous web W in our dry method is led through an atmosphere of conditioned air or gas and by means of suitable guide rolls, one of which is indicated at 13, to a tension device which may consist of a suspended roll 14 within a loop of the web W and supported by a cable 15 passing over a fixed roll 17 to a balancing weight 16. It will be understood that the weight 16 may be suitably adjusted to change the upward pressure of the roll 14 to vary the tension upon the web as it is withdrawn from the die. The purpose of the device, however, is to keep the tension uniform once it has been properly adjusted.

From the tension device, the web W is led over the guide rolls 18 and 19 into wrapping contact with one or more rotating ironing cylinders 20. Any suitable number of such ironing cylinders may be employed to give the effect desired, which is to improve the surface smoothness of the web and its uniformity of gauge or thickness. In order to treat both sides of the web, it is led alternately around the successive cylinders, and it will be understood that said cylinders are rotated by their own power to give a surface speed equal to that of the travel of the web so that rubbing friction of the web on the cylinders will be avoided. The speed of rotation of said cylinders 20 may be suitably regulated in an automatic manner from the position of the tension roll 14. Such automatic speed regulating means are well known and are not here shown.

The surface of the cylinders 20 may also be heated, if desired, to increase their ironing effect, and the heating of said cylinders should be carefully regulated with respect to their time of surface contact with the web to prevent any sticking of the web thereto. The pressure of wrapping contact of the web on the cylinders 20 will tend to compact the body of the web and smooth out its surface. Also the friction of said contact will act as a restraint upon the tendency of the web to contract transversely by shrinkage and will thereby improve the uniformity of gauge of the web.

Figure 5:
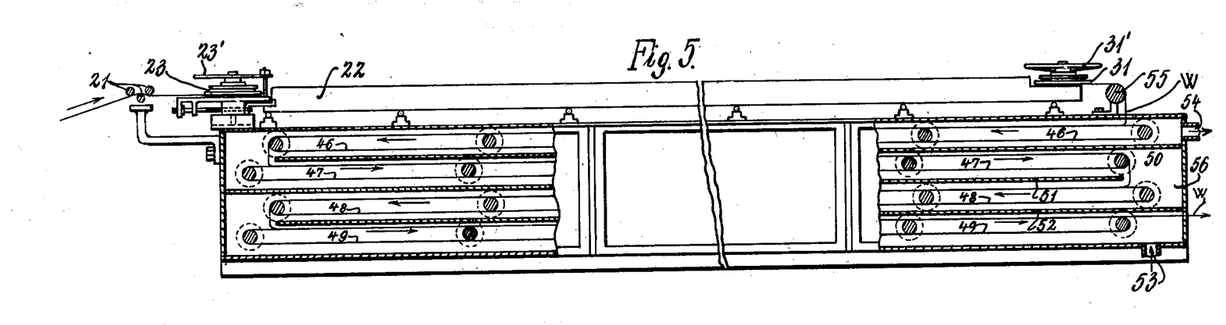
Fig. 5 is a view of an alternate form of seasoning chamber located, as shown, directly below the tenter and intended, when used, to replace the seasoning chamber shown in Fig. 3.
Figure 6:
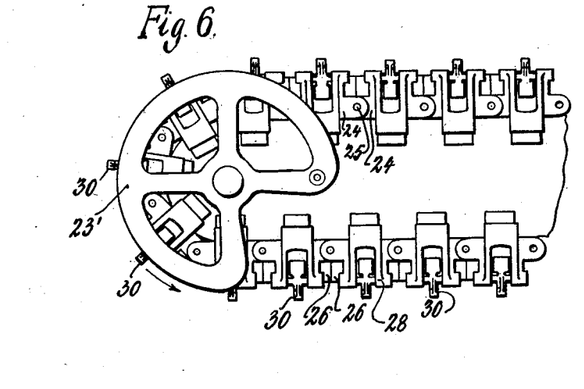
Fig. 6 is a detail view in plan, on somewhat larger scale, of one end of the tenter apparatus.
Figure 7:
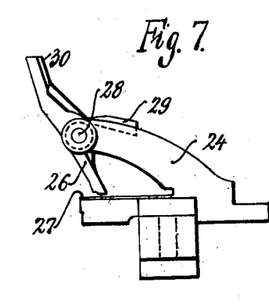
Fig. 7 is a detached view in elevation, on still larger scale, of one of the gripping devices which serve as links in the tenter chain.

The web is led from the ironing cylinders 20 through nipping rolls 21 to a tenter apparatus 22 (shown more fully in Figs. 5, 6 and 7). This tenter is of a construction generally familiar in the cloth treating industry and consists of two transversely-spaced apart, endless chains driven in a continuous manner and in synchronism, each chain passing around its respective guide wheels 23 and 31 at each end thereof. A portion of one of said tenter chains is shown in detail in Fig. 6 and is made up of a series of link members 24 connected by pivots 25, each link member consisting of a gripping device as shown in Fig. 7.

The gripping devices are designed to receive and grip the marginal edge of a traveling web and each device consists of a movable jaw 26 coacting with a fixed jaw 27, the movable jaw being pivoted at 28 and having a weighted horizontal extension 29 tending at all times to throw it into gripping position. A vertical extension 30 of each jaw 26 is adapted for engagement with a cam guide 23' fixed above the guide wheel 23 at one end of the chain run and a cam guide 31' above the wheel 31 at the other end of the chain run, for opening and closing said gripping jaws. It will be understood that as the web passes into the tenter the marginal edges of the web will pass into the opened gripping jaws of the tenter chain links and that as said chain links are carried beyond the engagement with the cam guides 23', the jaws of successive gripping devices will close upon the edges of the web and firmly grip the same. At the delivery end of the tenter, the link members 24 will successively bring their extensions 30 into engagement with the cam guides 31' and thus the jaws will be opened for releasing the web. The gripping jaws 26, 27 of adjacent link members 24 (as shown in Fig. 6) are wide enough so that they are in side to side abutting contact during the straight run of the chain, whereby a continuous portion of the marginal edges of the webs will be gripped during the travel of the web through the tenter. Means are usually provided on such a tenter (but not here shown) for adjusting the transverse distance between the chains for different widths of webs handled, and in some cases the chains of said tenters are guided or movable during their operation so as to run in a diverging course. In the present use of this apparatus, however, it is preferable to operate the tenter with the chains running in a fixed parallel course so that the stretching operation on the web is effected solely by the restraint of its tendency to contract by shrinkage. By carrying the chains of the tenter in a straight parallel course, we are able to employ gripping devices with adjacent jaws in close abutting contact during their grip on the web, and thus obtain the effect of a continuous, uninterrupted clamp on the web during its run through the tenter. The driving means for the tenter with speed changing mechanism therefor is shown generally at 32 in Fig. 3.

Figure 3:
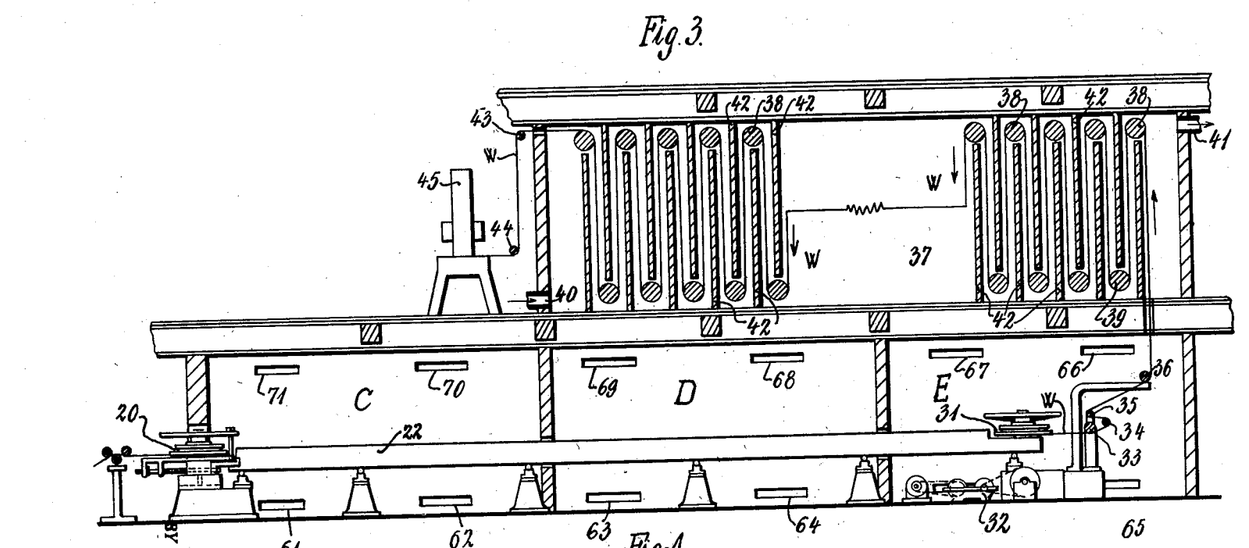
Fig. 3 illustrates the remainder of the train of apparatus from the beginning of the tenter and through the seasoning chamber.

Upon leaving the tenter, the web is led around guide rolls 33, 34, 35 and 36 into a seasoning chamber 37 wherein it passes up and down over upper and lower driven guide rolls 38 and 39 which may be of any number desired to give the requisite length of run for the web in the seasoning chamber for effecting its final drying and removal of solvent therefrom. The web passing out of the seasoning chamber will be led over guide rolls 43, 44 to a suitable web cutting machine 45 for cutting the finished web into sheets. The web, while in the seasoning chamber, is subjected to the drying action of a countercurrent of air or gas which may enter said chamber at the inlet 40 and leave at the outlet 41. In order to direct this countercurrent of air continuously against the travel of the web, the seasoning chamber may be provided with baffles or partitions 42, as shown, which form a continuous closed passage for the up and down run of the web through the seasoning chamber.

Referring to the web seasoning chamber and apparatus shown in Fig. 5, in this alternate form the web is led from the tenter 22 over guide roll 55 into the closed chamber 56, wherein are mounted a number of horizontally extending endless conveyor belts 46, 47, 48 and 49 upon which the web is successively carried from one to the other in the direction indicated by the several arrows in this figure. The conveyor belts are power driven and may be of suitable length and number to give the necessary duration for drying or seasoning action for the web. The several conveyor belts are separated, as shown, by partitions 50, 51, 52 into separate channels forming a continuous closed passage for the web and through which a countercurrent of drying air may be directed from an inlet 53 to an outlet 54 of said chamber 56.

Referring to Fig. 2, which shows the immersion bath, this consists of a suitable tank 74, long and shallow, within which is mounted a long endless conveyor belt 74, and a shorter delivery belt 76. The web W is discharged from the die 12 upon the belt 75 and delivered by belt 76 to the guide roll 13, after which the web travels the same course as described in connection with Figs. 1 and 3 or Fig. 5. The tank 74 is kept full, by means not shown, above the level of the web W with a liquid which will have no harmful effect on the pyroxylin, and which will be a non-solvent of pyroxylin but miscible with the liquid solvent of the pyroxylin. When ethyl acetate is used as the solvent of the pyroxylin, the liquid of the bath in tank 74 will be V. M. P. naptha. When the plasticiser of the pyroxylin is camphor, the naphtha bath will also contain sufficient camphor in solution to prevent any withdrawal of camphor from the web immersed therein. The length of the bath and tank 74 will depend upon the speed of travel of the web so as to give the duration of immersion required for a preliminary hardening of the web and to prepare it for its subsequent travel.

The chamber A through which the web passes from the die to the ironing cylinders is closed so that the drying air or gas therein may be controlled as to its condition for the preliminary drying action. An inlet 57 and outlet 58 for the air are provided in this chamber. Likewise, the chambers B, C, D and E are closed except for the inlets 59, 60, 61, 62, 63, 64 and 65 for the conditional air or gas and the outlets 66, 67, 68, 69, 70, 71, 72 and 73 therefore. Preferably the air condition in the separate chambers A, B, C, D and E is separately controlled, and the drying action on the web in chambers A and B will be relatively slow, while the drying action in the chambers C, D and E containing the tenter will be relatively fast. The delivery of the pyroxylin mass from the mixers to the filter and from the filter to the extruding machine is preferably through the closed conduits, as shown, to minimize solvent removal or admixture with dirt at these points.

It will be observed from the foregoing that the conversion of the pyroxylin and its formation into finished sheets is in effect a continuous operation and may be conducted with a very small amount of hand labor, a minimum of wastage and at high speed,—all of which contributes materially to economy of production.

No claim is made herein to that improvement which consists in altering the physical condition of the surface of the sheet by stretching the sheet while it is still plastic, as this is not our joint invention, but, on the contrary, is the joint invention of Robert G. O'Kane and Elmer R. Derby, and is claimed in an application Serial No. 427,780, filed by them February 12, 1930.

What we claim is:

1. The process of producing a hardened sheet of pyroxylin plastic or the like, which consists in the conversion of said pyroxylin into a viscous mass by mixing the pyroxylin and its plasticiser with a volatile liquid solvent; and before any appreciable amount of said solvent is removed, extruding said mass by pressure through a die in the form of a continuous web; and during the continuous travel of said web from said die, removing the solvent therefrom in successive stages; the first stage of solvent removal acting to effect a preliminary surface hardening of the web in preparation for its travel; the second stage acting to harden the body of the web while holding it in restraint against transverse contraction by shrinkage; and the third stage being to finally season the web while in a freely supported condition.

2. The process according to claim 1, wherein the third stage of solvent removal is accomplished by subjecting the traveling web to a counter current of drying air or gas.

3. The process according to claim 1, wherein after leaving the die, the web is carried into wrapping contact with the hard, smooth surface of a rotating cylinder or successive cylinders.

4. The process according to claim 1, wherein, after leaving the die, the web is carried into wrapping contact with the hard, smooth surface of a rotating cylinder or successive cylinders having a surface speed equal to that of the travelling web.

5. The process according to claim 1, wherein, during the second stage of solvent removal, the web is first carried into wrapping contact with the hard, smooth surface of a rotating cylinder or successive cylinders and thence carried forward while continuously clamped along both marginal edges thereof against transverse contraction by shrinkage.

6. The process according to claim 1, wherein, during the second stage of solvent removal, the web is first carried into wrapping contact with the hard surface of a rotating cylinder or successive cylinders, and is subjected while thereon to a relatively slow drying action, and thereafter the web is led forward and continuously clamped along both marginal edges thereof against transverse contraction by shrinkage during which clamped period the web is subjected to a relatively fast drying action.

7. The process according to claim 1, wherein, during the second stage of solvent removal, the web is first carried into wrapping contact with the hard surface of a rotating cylinder or successive cylinders, and is subjected while thereon to a relatively slow drying action, and thereafter the web is led forward and continuously clamped along both marginal edges thereof against transverse contraction by shrinkage during which clamped period the web is subjected to a relatively fast drying action, and during said third stage of solvent removal the traveling web is subjected to a counter current of drying air or gas.

8. The process according to claim 1 wherein said first stage of solvent removal takes place by immersion of said web in a liquid bath which is a non-solvent of pyroxylin but is miscible with the liquid solvent of said pyroxylin.

9. The process according to claim 1 wherein said conversion of said pyroxylin into a viscous mass is effected by a mixing with an excess of volatile liquid solvent.

10. The process according to claim 1 wherein the mixing of the pyroxylin and its plasticiser is with an excess of liquid solvent, and said first stage of solvent removal takes place by immersion of said web in a liquid bath which is a non-solvent of pyroxylin but miscible with the liquid solvent of said pyroxylin.

11. The process according to claim 1 wherein the mixing of the pyroxylin and its plasticiser is with an excess of liquid comprising a solvent of pyroxylin diluted with an amount of non-solvent of pyroxylin slightly less than that which will precipitate the pyroxylin in the mixture.

12. The process according to claim 1 wherein the mixing of the pyroxylin and its plasticiser is with an excess of liquid comprising a solvent of pyroxylin diluted with an amount of non-solvent of pyroxylin slightly less than that which will precipitate the pyroxylin in the mixture, and the said first stage of solvent removal takes place by immersion in a liquid bath which is a non-solvent of pyroxylin but is miscible with the liquid solvent of said pyroxylin.

13. The process of producing a hardened sheet of pyroxylin plastic or the like which consists in the conversion of said pyroxylin into a viscous mass by mixing the pyroxylin and its plasticiser with an excess of liquid comprising a solvent of pyroxylin diluted with an amount of non-solvent of pyroxylin slightly less than that which will precipitate the pyroxylin in the mixture, and then discharging said mass in the form of a continuous web into a hardening bath for the removal of said solvent.

14. The process according to claim 13, wherein the hardening bath is a non-solvent of pyroxylin but is miscible with the liquid solvent of said pyroxylin.

15. The process according to claim 13, wherein the liquid solvent for the mixing comprises ethyl acetate diluted with an amount of naptha slightly less than that which will precipitate the pyroxylin in the mixture, and the hardening bath is naptha.

16. The process according to claim 13, wherein the immersion of the web in the hardening bath is a first stage in the removal of solvent from the web and is followed by a second stage of drying during which the web is held in restraint against contraction by shrinkage and a final stage of seasoning during which the traveling web is subjected to a counter current of drying air or gas while in a freely supported condition.

17. The process according to claim 13, wherein the immersion of the web in the hardening bath is a first stage in the removal of solvent from the web and is followed by a second stage of drying during which the web is carried into wrapping contact with the hard smooth surface of a rotating cylinder or cylinders and thence forward while continuously clamped along both marginal edges thereof against transverse contraction by shrinkage.

18. The process according to claim 13, wherein the immersion of the web in the hardening bath is a first stage in the removal of solvent from the web and is followed by a second stage of drying during which the web is carried into wrapping contact with the hard smooth surface of a rotating cylinder or cylinders and thence forward while continuously clamped along both marginal edges thereof against transverse contraction by shrinkage, and finally the web while in freely supported condition is subjected to a counter current of drying air or gas for seasoning the same.

19. The process according to claim 1, wherein the mixing of the pyroxylin and its plasticiser is with an excess of a liquid comprising ethyl acetate diluted with an amount of naptha slightly less than that which will precipitate the pyroxylin in the mixture.

20. The process of producing a hardened sheet of pyroxylin plastic or the like which consists in the conversion of the pyroxylin into a viscous mass by mixing the pyroxylin and its plasticiser with an excess of liquid comprising ethyl acetate diluted with an amount of naptha slightly less than that which will precipitate the pyroxylin in the mixture and then discharging said mass in the form of a continuous web into a hardening bath containing naptha.

In testimony whereof we have affixed our signatures.

GUSTAVUS J. ESSELEN, Jr.
ROBERT G. O'KANE.